Figure 1:
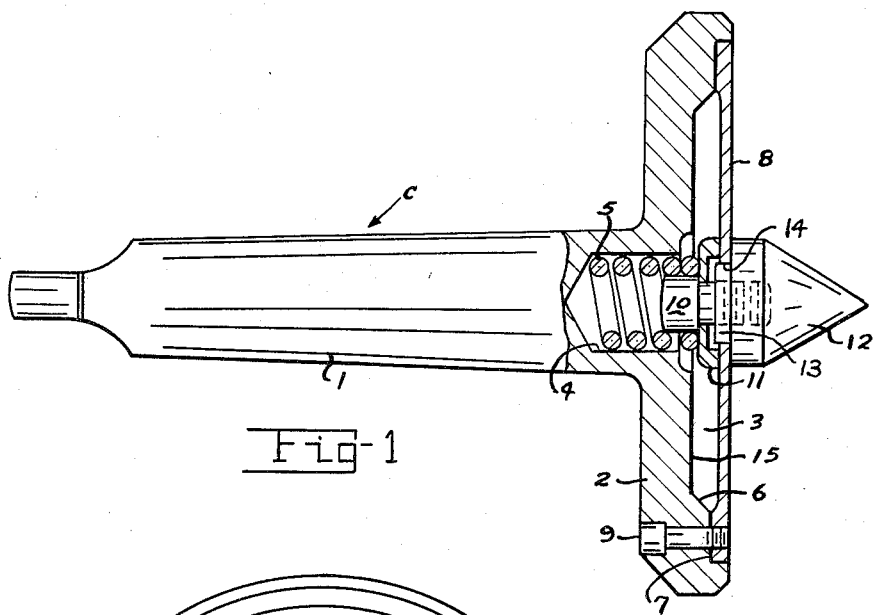

June 28, 1960

D. D. WALKER 2,942,510

WORK SUPPORT

Filed Nov. 8, 1957

INVENTOR.
DAVID D. WALKER
BY Tom Walker
ATTORNEY

United States Patent Office 2,942,510
Patented June 28, 1960

2,942,510

WORK SUPPORT

David D. Walker, Dayton, Ohio, assignor to Garrison Machine Works, Inc., Dayton, Ohio, a corporation of Ohio Filed Nov. 8, 1957, Ser. No. 695,356

5 Claims. (Cl. 82—33)

This invention relates to a work support and more particularly to an improved centering device for use in any machine processing work between centers.

In many instances fabrication requirements necessitate the machining of elements between centers. This operation has revealed inadequacies in prior art centering devices. For examples, the heat occurring in the working of elements between centers generally causes work expansion and results in galling and excessive wear of the work supports. Consequently, the operating life of the centering devices employed is shortened and their prolonged use introduces inaccuracies in the machining operations.

A primary object of the invention is to simplify the construction as well as the means and mode of operation of work supports in the nature of centering devices whereby such devices may not only be more economically manufactured, but will be more efficient and satisfactory in use, adaptable to a wide variety of applications, and be unlikely to get out of repair.

The present invention provides a spring loaded centering device which readily adapts itself to expansion and contraction of the work held thereby in a manner to prevent galling and excessive wear of the device in use. The device employs a replaceable centering element which is mounted to a resilient heat dissipating diaphragm operatively to tightly maintain the element being worked in a constant relative position to the working tool so as to prevent chattering. The operating life of centering devices fabricated in accordance with the invention is extended in nature and its efficiency in use is at a maximum.

A further object of the invention is to provide an improved centering device which will breathe in operation to follow the expansion and contraction of work supported thereby.

A further object of the invention is to provide an improved work support incorporating means for dissipating heat from the work supported thereby.

An additional object of the invention is to provide an improved work support in the nature of a center wherein the work engaging means is spring loaded and resiliently mounted to avoid galling and excessive wear in use.

Another object of the invention is to provide an improved centering device employing a replaceable centering element mounted to a resilient heat dissipating diaphragm.

A further object of the invention is to provide a work support possessing the advantageous structural features, the inherent meritorious characteristics and the mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
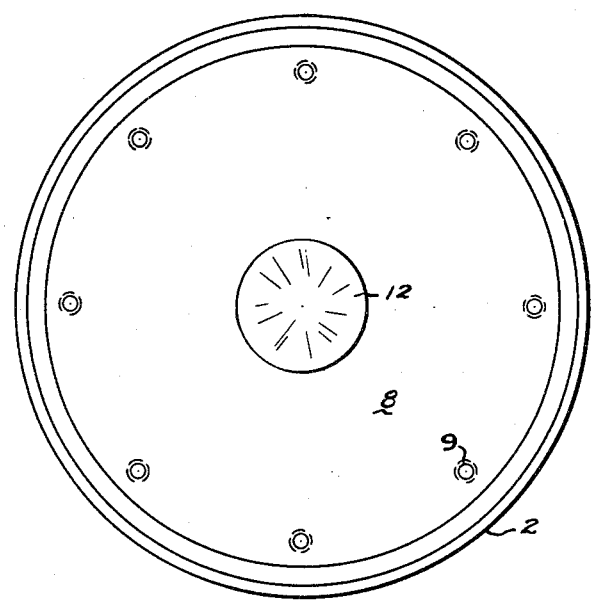

Referring to the accompanying drawing wherein is shown one but obviously not necessarily the only form of embodiment of the invention, Fig. 1 is an elevation view of a work support in accordance with the invention shown partly in section; and Fig. 2 is an end view of the device of Fig. 1.

Like parts are indicated by similar characters of reference throughout the several views.

The invention can be best described with reference to the embodiment illustrated in the drawings. The center C includes a shaft-like shank 1 having a circularly expanded head 2 at its outer end. The outermost face of the head 2 is provided with a stepped central recess 3 which extends axially inward of the shank 1. The innermost portion 4 of the recess 3 is cylindrical in nature and seats a coil spring 5. The recess 3 is substantially expanded within the head 2 to provide a base 15 defined by a conically expanding wall 6 which extends to a plane immediately adjacent and closely spaced from the outermost face of the head 2 where the recess is further expanded to provide an annular shoulder 7 facing outwardly of the head.

A centrally apertured metallic diaphragm 8 seats over the recess 3 to have its peripheral portion seat to the shoulder 7 and be fixed thereto by bolts 9 extending through the head to threadedly engage the diaphragm.

A screw stud 10 is provided with a relatively expanded head which nests within the coil spring 5 in the innermost portion 4 of the recess 3. The screw stud projects through the central aperture in the diaphragm 8 and has a centrally apertured cap 11 thereabout which respectively abuts spring 5 and the inner surface of the diaphragm about the central aperture. A center 12 is threadedly engaged over the outer end of the stud 10 to abut the outer surface of the diaphragm. Threading of the center 12 to the stud 10 draws the apertured cap into relatively fixed relation to the inner surface of the diaphragm in opposition to the male center. The coil spring 5 which encloses the expanded head of the screw stud abuts the innermost surface of cap 11 to apply a continuous bias to the diaphragm therethrough and to maintain its normally planar condition, as illustrated in Fig. 1 of the drawings.

For precisely locating the center 12 with respect to the diaphragm 8, a pilot 13 is provided. Such pilot cooperates with an aperture 14 in the diaphragm 8 to thereby accurately locate the center on the diaphragm prior to engagement of the stud 10 and cap 11 thereto.

The centering device of the invention may be mounted by means of its shank 1 either to a head stock or a tail stock to appropriately support an element being worked between centers. The spring loaded diaphragm tends to maintain the centering element in a predetermined position in relation to work supported thereby. In the processing of an element being worked between centers, the heat resulting from the working is apt to expand the element. This is readily accommodated by the resilient diaphragm and the coil spring. Additionally, the heat from the work is rapidly transmitted to the diaphragm which provides an extensive surface area to rapidly dissipate this heat. Accordingly, the invention apparatus assists in maintaining the operating temperature of the element being worked at a minimum with a resultant precision in machining and high quality of product. The resilient accommodation provided by the centering apparatus prevents undue galling or wear on the center and tends to maintain the work in a relatively constant relation to the tool.

It is noted that the diaphragm employed can be any diameter or thickness necessary to get the correct load on the center or provide the correct deflection for the particular application of the center. The employment of the invention apparatus stops chattering and maintains the work in a right condition and at the same relative position to the operating tool during the working operation. While a male center is shown, the adaptability of the assembly enables a replacement of the center by a female center or any other type support device.

Substantial economies result from the employment of the work support of the invention and higher quality products are enabled thereby. While the invention has been described with reference to centering devices, it will be understood by those versed in the art that the application of the invention is not so limited.

From the above description it will be apparent that that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A centering device, including a shank having at one end thereof an expanded head, there being a recess in said head, a diaphragm overlying said recess and seating at its outer edge on said head, said diaphragm being thin and flexible and made for facile heat transmission, a centering element installed in said diaphragm, and resilient means received in said recess in axial alignment with said centering element resisting inward flexing of said diaphragm.

2. A centering device, including a shank having at one end thereof an expanded head, said head providing peripherally thereof an outwardly projecting shoulder, a flexible metallic diaphragm seated on said shoulder, a central portion of said diaphragm being unsupported, a center installed in the central portion of said diaphragm, said center including a centering element projecting outwardly of said diaphragm and a stud projecting inwardly of said diaphragm, a recess in said head accommodating said stud and resilient means received in said recess to be aligned with said center and resisting inward flexure of said diaphragm.

3. A centering device, including a shank having at one end thereof an expanded head, said head providing peripherally thereof an outwardly projecting shoulder, a flexible metallic diaphragm seated on said shoulder, a central portion of said diaphragm being spaced from said head, resilient means interposed between said head and the central portion of said diaphragm to inhibit inward flexing of said diaphragm, and a center installed in said diaphragm and aligned with said resilient means.

4. A centering device according to claim 3, characterized in that said center comprises a centering element projecting forwardly of said diaphragm, a stud united with said element and projecting axially thereof through said diaphragm and inwardly thereof, and a cap on said stud inwardly of said diaphragm providing a seat for one end of said resilient means and limiting against said diaphragm the other end of said resilient means seating against said head.

5. A centering device, including a head having an outer face recessed to provide a continuous peripheral projecting shoulder, a diaphragm seated on said projecting shoulder, a portion of said diaphragm being relatively unsupported, said diaphragm being flexible, a center installed in the unsupported portion of said diaphragm, said center comprising a center element projecting outwardly of the diaphragm, a stud united with said element and projecting through and inwardly of the diaphragm, said stud having an enlarged head on its inner end, a cap interposed between the enlarged head on said stud and said diaphragm, and a compression spring installed in said head in alignment with said center based at its one end upon said head and engaging said cap at its outer end.

References Cited in the file of this patent

UNITED STATES PATENTS

| | | |
|---|---|---|
| 1,389,272 | Scaife | Aug. 30, 1921 |
| 1,462,409 | Howard | July 17, 1923 |
| 2,056,586 | Rohm | Oct. 6, 1936 |
| 2,142,639 | Fish | Jan. 3, 1939 |
| 2,453,262 | Peters | Nov. 9, 1948 |
| 2,671,370 | Wiest | Mar. 9, 1954 |

FOREIGN PATENTS

| | | |
|---|---|---|
| 898,487 | France | July 3, 1944 |
| 280,249 | Switzerland | Apr. 16, 1952 |
| 752,792 | Great Britain | July 18, 1956 |